(12) United States Patent
Trainer et al.

(10) Patent No.: US 12,742,687 B2
(45) Date of Patent: Sep. 22, 2026

(54) JUNCTION TEMPERATURE ESTIMATION

(71) Applicant: ROLLS-ROYCE plc, London (GB)

(72) Inventors: David R Trainer, Derby (GB); Peter J Cox-Smith, Derby (GB); Jonathan C Nicholls, Derby (GB); Mark Sweet, Chesterfield (GB)

(73) Assignee: ROLLS-ROYCE plc, London (GB)

( * ) Notice: Subject to any disclaimer, the term of this patent is extended or adjusted under 35 U.S.C. 154(b) by 306 days.

(21) Appl. No.: 18/425,008

(22) Filed: Jan. 29, 2024

(65) Prior Publication Data

US 2024/0280414 A1 Aug. 22, 2024

(30) Foreign Application Priority Data

Feb. 21, 2023 (GB) ..................................... 2302440

(51) Int. Cl.

| | |
|---|---|
| ***G01K 7/01*** | (2006.01) |
| ***F01D 21/00*** | (2006.01) |
| ***H02M 1/32*** | (2007.01) |

(52) U.S. Cl.

CPC .............. *G01K 7/01* (2013.01); *H02M 1/327* (2021.05); *F01D 21/003* (2013.01); *F05D 2220/323* (2013.01); *G01K 2217/00* (2013.01)

(58) Field of Classification Search

CPC ... F01D 21/003; F05D 2220/323; G01K 7/01; G01K 2217/00; G01K 7/427;

(Continued)

(56) References Cited

U.S. PATENT DOCUMENTS

| | | | |
|---|---|---|---|
| 11,016,138 | B2 | 5/2021 | Kimura et al. |
| 11,525,740 | B2 | 12/2022 | Akin et al. |

(Continued)

FOREIGN PATENT DOCUMENTS

| | | | |
|---|---|---|---|
| CN | 209542769 | U | 10/2019 |
| CN | 111880069 | A | 11/2020 |

(Continued)

OTHER PUBLICATIONS

Huang et al., "Extraction of Junction Temperature of SiC MOSFET Module Based on Turn-On dIDS/dt," Energies, 2018, vol. 11, No. 8, 1951, 15 pages.

(Continued)

*Primary Examiner* — Amy He
(74) *Attorney, Agent, or Firm* — Oliff PLC

(57) ABSTRACT

The disclosure relates to estimation of junction temperatures of transistors in a power electronics converter. Example embodiments include a method of estimating a junction temperature of a transistor in a power electronics converter configured to convert between first and second supply voltages, the method comprising: providing a gate switching signal to the transistor; measuring a rate of change of current through the converter during a switching period of the transistor; and outputting an estimated junction temperature of the transistor based on the measured rate of change of current, wherein the rate of change of current is measured while a gate voltage of the transistor is above a gate threshold voltage and a drain-source voltage across the transistor is above a predetermined fraction of the first or second supply voltage whereby the rate of change of current is measured in a linear region.

20 Claims, 8 Drawing Sheets

(58) Field of Classification Search
CPC ... H02M 1/327; G01R 31/2628; H03K 17/18; H03K 2017/0806; H03K 2217/00
See application file for complete search history.

(56) References Cited

U.S. PATENT DOCUMENTS

| | | | |
|---|---|---|---|
| 12,264,976 | B2 | 4/2025 | Costanzo et al. |
| 2021/0063467 | A1 | 3/2021 | Kazmirski et al. |
| 2024/0186889 | A1 | 6/2024 | Nadarajan et al. |
| 2024/0280414 | A1 | 8/2024 | Trainer et al. |
| 2025/0316976 | A1 | 10/2025 | Trainer et al. |

FOREIGN PATENT DOCUMENTS

| | | | | |
|---|---|---|---|---|
| CN | 113848444 | A | 12/2021 | |
| CN | 117220560 | A | 12/2023 | |
| EP | 3 255 443 | A1 | 12/2017 | |
| EP | 3118638 | B1 | 8/2019 | |
| EP | 3730408 | A1 * | 10/2020 | H02J 1/00 |
| EP | 4 170 729 | A1 | 4/2023 | |

OTHER PUBLICATIONS

Jun. 21, 2024 Extended Search Report issued in European Patent Application No. 24153303.3.
Jun. 21, 2024 Extended Search Report issued in European Patent Application No. 24153302.5.
Aug. 7, 2023 Search Report issued in British Patent Application No. 2302440.9.
Hedayati et al., "Overtemperature Protection Circuit for GaN Devices Using a di/dt Sensor", IEEE Transactions on Power Electronics, vol. 36, No. 7, Jul. 2021, pp. 7417-7428.
Jul. 3, 2023 Search Report issued in British Patent Application No. 2302441.7.
U.S. Appl. No. 18/424,999, filed Jan. 29, 2024 in the name of David R. Trainer et al.

* cited by examiner

JUNCTION TEMPERATURE ESTIMATION

CROSS-REFERENCE TO RELATED APPLICATIONS

This specification is based upon and claims the benefit of priority from United Kingdom Patent Application No. 2302440.9, filed on 21 Feb. 2022, the entire contents of which are incorporated herein by reference.

TECHNICAL FIELD

The disclosure relates to estimation of junction temperatures of transistors in a power electronics converter.

BACKGROUND

In aerospace, the more electric engine (MEE) and more electric aircraft (MEA) concepts are seen as increasingly attractive due to their potential to reduce fuel consumption. Such aircraft generally require a high voltage DC electrical network, operating with a DC bus voltage of for example around 270V or 540V. Power electronics converters are used to convert between the DC supply on the DC electrical network and AC supplies for electrical machines and DC supplies for battery storage. Such converters may be employed in safety critical applications, for example in starter-generators for gas turbine engines, oil pumps, fuel pumps and electrical actuation systems. Safety and reliability of such converters is therefore of critical importance. Power electronics converters may also be used in electrical or hybrid propulsion systems in land or sea applications, in which safety and reliability is also important but where weight may be less of a critical factor.

The maximum semiconductor junction temperature is a critically important parameter when designing and operating power electronic conversion equipment. The maximum junction temperature sets the maximum allowable current rating both in steady state conditions and the temporary over-current capability when responding to dynamic operating conditions and faults.

Traditionally, semiconductor junction temperature information is obtained from an NTC (negative temperature coefficient) thermistor mounted within the power module close to the semiconductor die. However, such devices cannot directly measure the junction temperature when the converter is operational. The thermistor approach inherently introduces a time lag because its resistance change with temperature cannot occur instantaneously and will also lag behind the actual temperature changes within the semiconductor.

Indirect methods of estimating junction temperature include using computer models or algorithms to predict junction temperature based on a simulation of the semiconductor, for example including its thermal impedances and a history of current flowing in the semiconductors. Such methods are not capable of providing an accurate and reliable measure of instantaneous temperature. A more accurate real-time estimation of junction temperature is therefore highly desirable. With such information, converters could be operated closer to their thermal limit, allowing the amount of power and reactive power for a given design to be increased. Furthermore, knowledge of the junction temperature could allow over-current conditions to persist for a longer period where necessary, which is important when responding to fault conditions and supplying a high current to downstream protection. An unexpected increase in the junction temperature of any particular transistor may also be used to indicate a deterioration or partial failure of the device itself, its thermal management system or its control system and can be useful in assessing the health of the conversion equipment and need for maintenance.

SUMMARY

According to a first aspect there is provided a method of estimating a junction temperature of a transistor in a power electronics converter configured to convert between first and second supply voltages, the method comprising:

providing a gate switching signal to the transistor;

measuring a rate of change of current through the converter during a switching period of the transistor; and outputting an estimated junction temperature of the transistor based on the measured rate of change of current, wherein the rate of change of current is measured while a gate voltage of the transistor is above a gate threshold voltage and a drain-source voltage across the transistor is above a predetermined fraction of the first or second supply voltage whereby the rate of change of current is measured in a linear region.

By measuring the rate of change of current in a linear region (i.e., where the current is rising in a linear fashion), the transistor is still supporting most of the DC voltage and the device is still highly resistive. The rate of change of current is therefore controlled by the semiconductor switching and not by external influences like stray inductance. Consequently, the estimate of the temperature is more accurate than if, e.g., a peak value of the rate of change of current were to be used.

The power electronics converter may convert between a DC supply voltage and an AC supply voltage (i.e. DC:AC or AC:DC) or between a first DC supply voltage and a second DC supply voltage (i.e. DC:DC). One or both of the first and second supply voltages is therefore a DC supply voltage.

The predetermined fraction may be between around 0.75 and 0.95 of the first or second supply voltage.

The switching period, i.e., the period within which the rate of change of current is measured, may be between around 20 ns and 100 ns.

The converter may comprise a plurality of transistors and a capacitor, the rate of change of current measured by a Rogowski coil located around a conductor of the converter between the plurality of transistors and the capacitor.

A current sensor (e.g., Rogowski coil) may provide composite di/dt information for each of the plurality of transistors. By relating the di/dt signal to turn-on commands for each of the plurality of transistors, a junction temperature may be estimated for each of the transistors.

In particular examples:

a controller provides the gate switching signal to the transistor;

the measured rate of change of current is provided to an analogue to digital converter (ADC);

the ADC provides a digital output signal from the measured rate of change of current to a processor;

the processor synchronises the gate switching signal ($V_{GS1-6}$) from the controller with the digital output signal and extracts a measurement of rate of change of current for the switching period; and a look-up table receives the extracted measurement of rate of change of current and outputs a corresponding junction temperature value for the transistor.

The method may be repeated for each one of a plurality of transistors of the converter.

The method may comprise changing a value of a gate resistor connected to the transistor prior to providing a gate switching signal to the transistor.

The value of the gate resistor may be increased prior to providing the gate switching signal to the transistor and decreased after measuring the rate of change of current through the converter during the switching period of the transistor.

The gate switching signal may be provided to switch the transistor from a non-conducting state to a conducting state.

The gate switching signal may in some alternative examples be provided to switch the transistor from a conducting state to a non-conducting state.

The transistor may be a MOSFET, for example a SiC MOSFET.

According to a second aspect there is provided an electrical power system comprising:

- a power electronics converter configured to convert between first and second supply voltages, the converter comprising a plurality of semiconductor switches, each semiconductor switch comprising a transistor;
- a controller configured to provide switching signals to each of the semiconductor switches;
- a current sensor arranged to measure current through the converter to one of the first and second voltage supplies; and
- a junction temperature measurement module configured to:
- receive a current signal from the current sensor;
- measure from the current signal received from the current sensor a rate of change of current through the converter during a switching period of the transistor while a gate voltage of the transistor is above a gate threshold voltage and a drain-source voltage across the transistor is above a predetermined fraction of the first or second supply voltage; and
- output an estimated junction temperature of the transistor based on the measured rate of change of current.

The power electronics converter may be configured to convert between a DC supply voltage and an AC supply voltage or between a first DC supply voltage and a second DC supply voltage. One or both of the first and second supply voltages may therefore be a DC supply voltage.

The switching period may be between around 20 ns and 100 ns.

The converter may comprises a capacitor connected across one of the supplies, the current sensor comprising a Rogowski coil located around a conductor of the converter between the plurality of transistors and the capacitor.

The current sensor (e.g., Rogowski coil) may provide composite di/dt information for each of the plurality of semiconductor switches. By relating the di/dt signal to turn-on commands for each of the plurality of semiconductor switches, a junction temperature may be estimated for each of the semiconductor switches.

The junction temperature measurement module may comprise:

- an analogue to digital converter (ADC) configured to receive the current signal and convert the current signal to a digital output signal;
- a processor configured to: receive a gate switching signal from the controller and the digital output signal from the ADC; synchronise the gate switching signal from the controller with the digital output signal and extract a measurement of rate of change of current for the switching period; and
- a look-up table configured to receive the extracted measurement of rate of change of current from the processor and output a corresponding junction temperature value for the transistor.

The junction temperature measurement module may further comprise a current integrator configured to integrate the current signal from the current sensor and provide a measure of current through the converter as an input to the look-up table.

The look-up table may be further configured to receive a measure of a threshold voltage for the transistor and output the corresponding junction temperature value for the transistor according to the measured threshold voltage.

The processor may be configured to extract a measurement of rate of change of current for the switching period for each one of the plurality of transistors.

The transistor may be a MOSFET, such as a SiC MOSFET.

According to a third aspect there is provided an aircraft propulsion system comprising the electrical power system of the second aspect.

According to a third aspect there is provided an aircraft comprising the electrical power system of the second aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

FIG. 1

Figure 1:
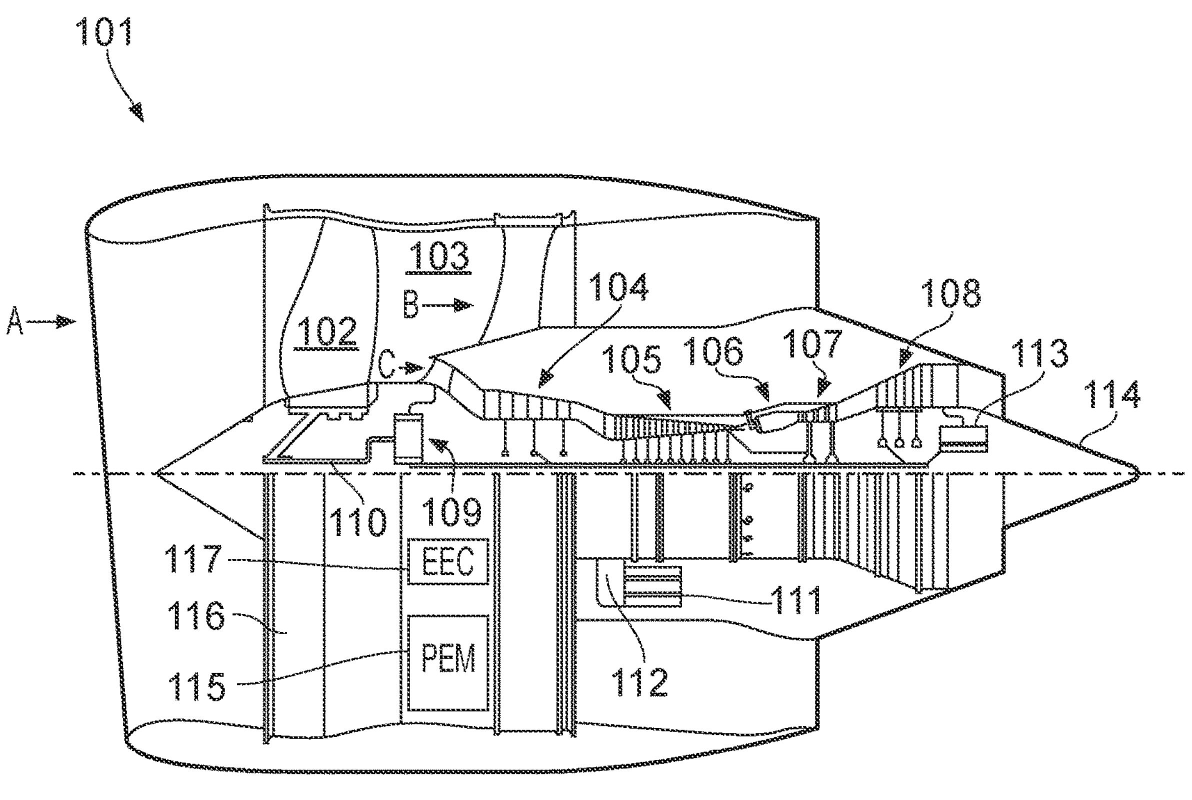
FIG. 1 shows a general arrangement of a turbofan engine for an aircraft.

A general arrangement of an engine 101 for an aircraft is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of FIG. 1 comprises one or more rotary electrical machines, generally capable of operating both as a motor and as a generator. The number and arrangement of the rotary electrical machines will depend to some extent on the desired functionality. Some embodiments of the engine 101 include a single rotary electrical machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electrical machine 111 coupled with the high pressure spool and a second rotary electrical machine 113 coupled with the low pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electrical machine 111 is driven by the high-pressure spool by a core-mounted accessory drive 112 of conventional configuration. In alternative embodiments, the first electrical machine 111 may be mounted coaxially with the turbomachinery in the engine 101. For example, the first electrical machine 111 may be mounted axially in line with the duct between the low- and high-pressure compressors 104 and 105. In FIG. 1, the second electrical machine 113 is mounted in the tail cone 114 of the engine 101 coaxially with the turbomachinery and is coupled to the low-pressure turbine 108. In alternative embodiments, the second rotary electrical machine 113 may be located axially in line with low-pressure compressor 104, which may adopt a bladed disc or bladed drum configuration to provide space for the second rotary electrical machine 113. It will of course be appreciated by those skilled in the art that any other suitable location for the first and (if present) second electrical machines may be adopted.

The first and second electrical machines 111, 113 are connected with power electronics. Extraction of power from or application of power to the electrical machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electrical machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e. both of the core gas turbine and the first and second electrical machines 111 and 113. In this way, the EEC 117 may holistically respond to both thrust demand and electrical power demand.

The one or more rotary electrical machines 111, 113 and the power electronics 115 may be configured to output to or receive electric power from one, two or more dc busses. The dc busses allow for the distribution of electrical power to other engine electrical loads and to electrical loads on the airframe.

Those skilled in the art will appreciate that the gas turbine engine 101 described above may be regarded as a 'more electric' gas turbine engine because of the increased role of the electrical machines 111, 113 compared with those of conventional gas turbines.

Figure 2A:
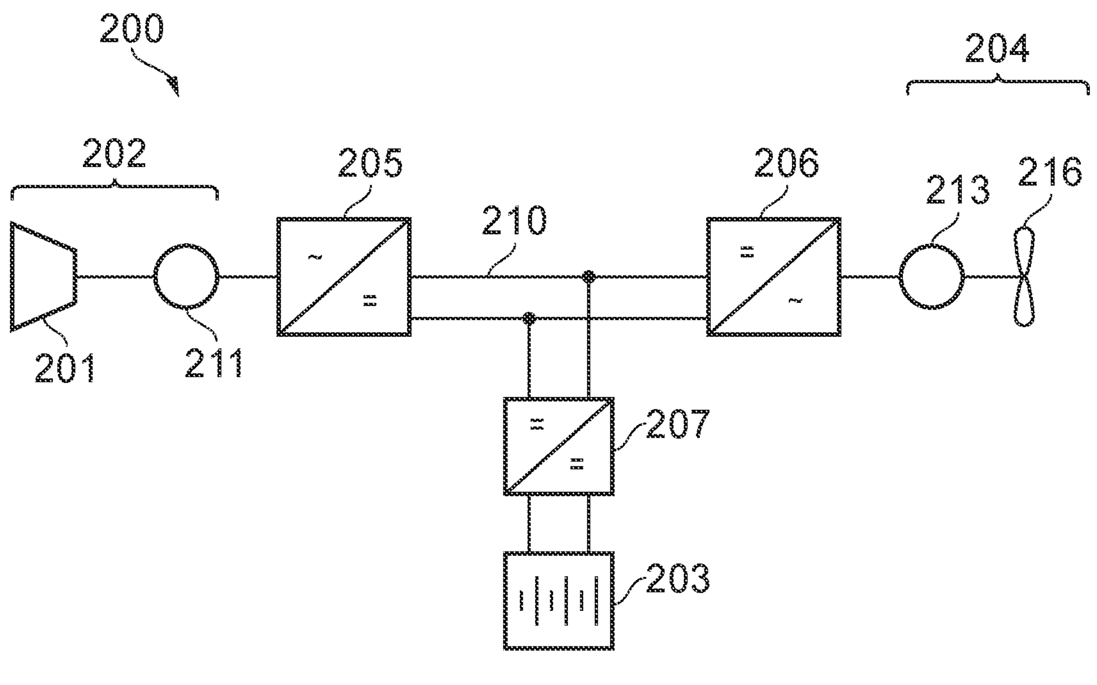
FIG. 2A is a schematic illustration of a hybrid electric aircraft propulsion system.
Figure 2B:
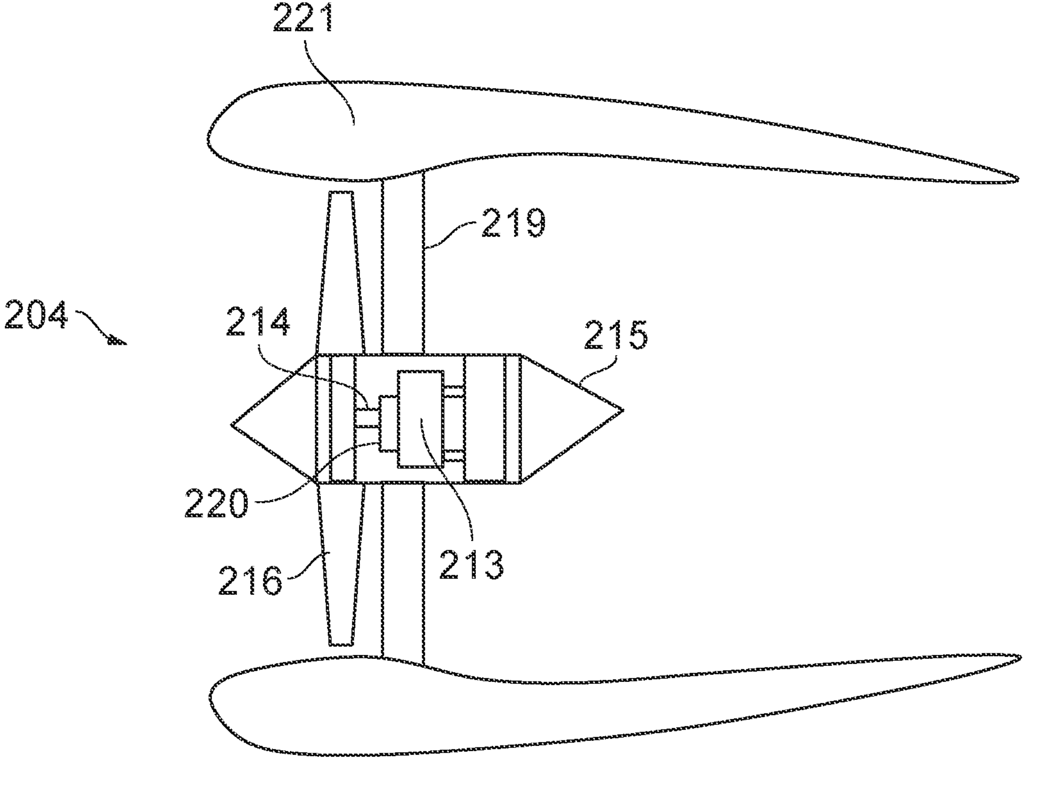
FIG. 2B illustrates an electrically powered propulsor such as may be used in a hybrid electric propulsion system.

FIGS. 2A and 2B

FIG. 2A illustrates an exemplary propulsion system 200 of a hybrid electric aircraft. The propulsion system 200 includes a generator set 202 comprising a gas turbine engine 201 and electrical generator 211, and a battery pack 203. Both the generator set 202 and the battery pack 203 are used as energy sources to power a motor-driven propulsor 204, an example of which is shown in FIG. 2B.

The illustrated propulsion system 200 further comprises an AC/DC converter 205, a dc distribution bus 210, a DC/AC converter 206 and a DC/DC converter 207. It will be appreciated that whilst one generator set 202 and one propulsor 204 are illustrated in this example, a propulsion system 200 may include more than one generator set 202 and/or one or more propulsor 204.

A shaft or spool of the engine 201 is coupled to and drives the rotation of a shaft of the generator 211 which thereby produces alternating current. The AC/DC converter 205, which faces the generator 211, converts the alternating current into direct current which is fed to various electrical systems and loads via the dc distribution bus 210. These electrical systems include non-propulsive loads (not shown in FIG. 2A) and the motor-driven propulsor 204, which comprises a motor 213 which drives a propulsor 204 via the DC/AC converter 206.

The battery pack 203, which may be made up of a number of battery modules connected in series and/or parallel, is connected to the dc distribution bus 210 via the DC/DC converter 207. The DC/DC converter 207 converts between a voltage of the battery pack 203 and a voltage of the dc distribution bus 210. In this way, the battery pack 203 can replace or supplement the power provided by the generator set 202 (by discharging and thereby feeding the DC distribution bus 210) or can be charged using the power provided by the generator set 202 (by being fed by the dc distribution bus 210).

Referring to FIG. 2B, in this example the propulsor 204 takes the form of a ducted fan. The fan 216 is enclosed within a fan duct 219 defined within a nacelle 221 and is mounted to a core nacelle 215. The fan 216 is driven by the electrical machine 213 via a drive shaft 214, both of which may also be thought of as components of the propulsor 204. In this embodiment a gearbox 220 is provided between the electrical machine 213 and the drive shaft 214.

The electrical machine 213 is supplied with electric power from a power source, for example the generator set 202 and/or the battery 203 via the de bus 210. The electrical machine 213 of the propulsor, and indeed the electrical machine 211 of the generator set 202, may be of any suitable type, for example of the permanent magnet synchronous type.

Those skilled in the art will recognise the propulsion system 200 of FIGS. 2A-B to be of the series hybrid type. Other hybrid electric propulsion systems are of the parallel type, while still others are of the turboelectric type or have features of more than one type. The configuration of the more electric engine 101 of FIG. 1 may be considered similar to a parallel hybrid system, with the main distinction being the roles of the electrical machines. For example, the electrical machines of a more electric engine are generally only used in motor mode to start the engine and to improve engine operability, whereas the electric machines of a parallel hybrid propulsion system are used to motor the spools to meaningfully add to the amount of propulsive thrust produced by the turbomachinery.

FIG. 3

Figure 3:
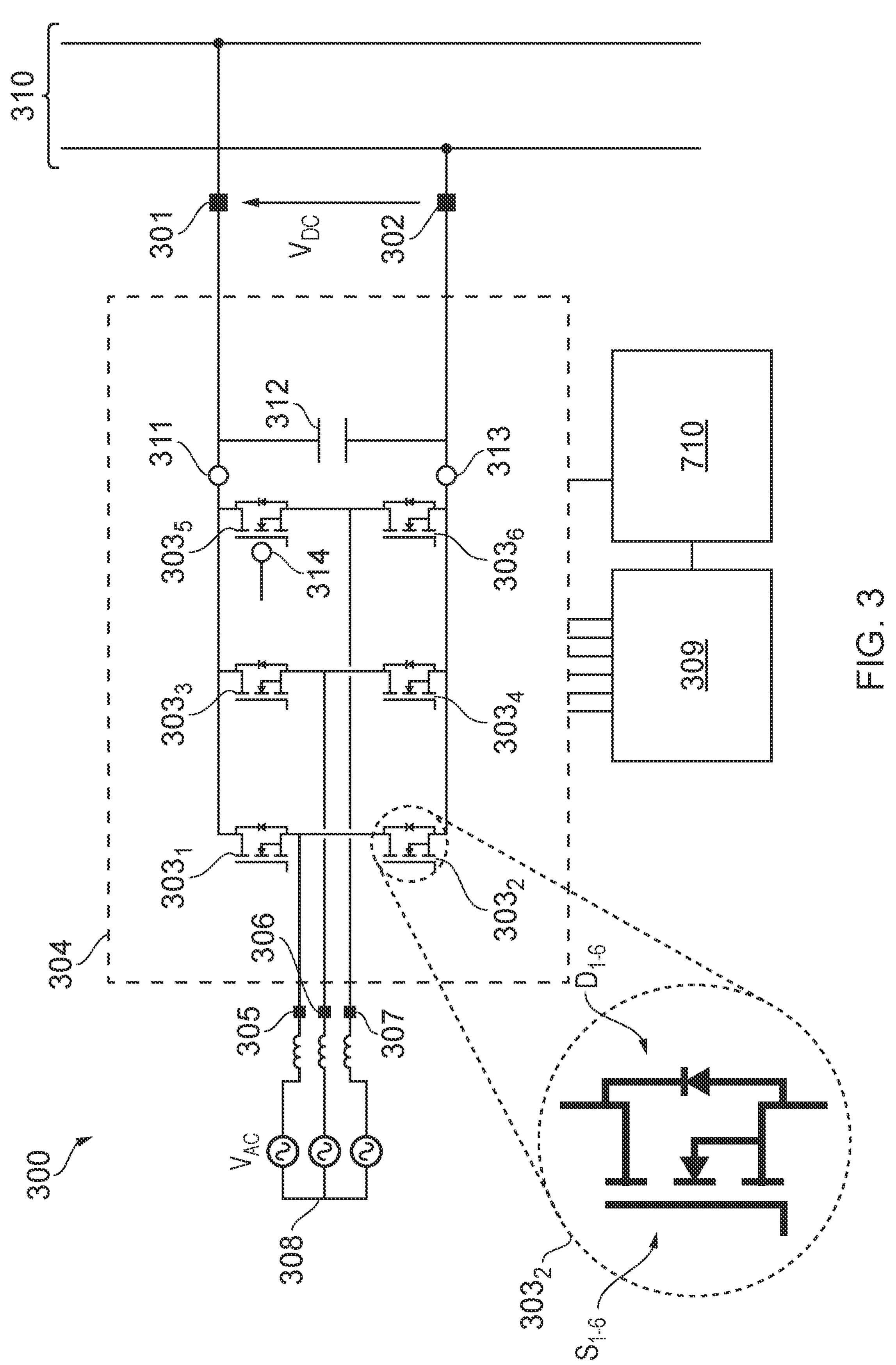
FIG. 3 is a schematic diagram of an example AC:DC power electronics converter.

FIG. 3 is a schematic diagram illustrating an example electrical power system 300 comprising a power electronics converter 304. The power electronics converter 304 converts electrical power between a first supply with a DC voltage $V_{DC}$ across first and second DC terminals 301, 302 and a second supply with an AC voltage $V_{AC}$ across AC terminals 305, 306, 307. The converter 304 in this example converts between a three phase AC supply 308 and a DC bus 310 connected to the first and second DC terminals 301, 302. The AC supply 308 may be connected to an electrical machine configured to operate as a motor or generator.

A plurality of semiconductor switches 303$_{1-6}$ is connected between the DC terminals 301, 302 and the AC supply 308. Each semiconductor switch 303$_{1-6}$ comprises a transistor $S_1$-$S_6$ connected in parallel with a reverse biased diode $D_1$-$D_6$. The diodes $D_1$-$D_6$ may be the body diodes of the MOSFETs $S_{1-6}$ or may be separate parallel connected diodes. The diodes $D_1$-$D_6$ may alternatively be forward biased. The switches 303$_{1-6}$ are arranged in series connected pairs, each of a first pair 303$_1$, 303$_2$, a second pair 303$_3$, 303$_4$ and a third pair 303$_5$, 303$_6$ being connected in series between the first and second DC terminals 301, 302. A node 305, 306, 307 between each pair of switches is connected to a respective terminal of the AC supply 308.

Each of the semiconductor switches 303$_{1-6}$ comprises a switch transistor $S_{1-6}$ and a reverse-biased diode $D_{1-6}$ connected in parallel, one of which is illustrated in closer detail in FIG. 3. A drain connection of a first one 303$_1$, 303$_3$, 303$_5$ of each pair of semiconductor switches is connected to the first DC terminal 301. A source or emitter connection of the first one 303$_1$, 303$_3$, 303$_5$ of each pair of semiconductor switches and a drain or common connection of a second one 303$_2$, 303$_4$, 303$_6$ of each pair of semiconductor switches is connected to a respective AC terminal 305, 306, 307. A source or emitter connection of the second one 303$_2$, 303$_4$, 303$_6$ of each pair of semiconductor switches is connected to the second DC terminal 302.

The transistor switches $S_{1-6}$ may be bipolar transistors, power MOSFETs or insulated-gate bipolar transistors (IGBTs). In particular implementations, the transistor switches $S_{1-6}$ may be SiC MOSFETs.

A controller 309 is connected to control a switching operation of the switches 303$_{1-6}$ to enable the converter 304 to convert between the AC voltage across the AC terminals 305, 306, 307 and the DC voltage $V_{DC}$ across the DC terminals 301, 302. The converter 304 may be operated by the controller 309 to convert an AC voltage at the AC supply 308 to the DC voltage $V_{DC}$ at the DC bus 310 or from the DC voltage $V_{DC}$ to an AC voltage at the AC supply 308, depending on the desired direction of power flow. An electrical machine connected to the AC supply side of the converter 304 may thereby operate as an electric generator or motor, either generating or being powered by the AC supply 308. In the illustrated example, the AC supply comprises three phases. In alternative examples a different number of phases may be present.

The gate voltage of each of the switch transistors $S_{1-6}$ is controlled by the controller 309 to control the switching operation of the semiconductor switches 303$_{1-6}$.

In alternative examples, the power electronics converter may be a DC:DC converter, i.e. converting between a first DC supply and a second DC supply, which may for example be used between a battery 203 and a DC distribution bus 210 as illustrated in FIG. 2A. Similar principles regarding control of the gate voltages and switching frequencies also apply to DC:DC converters.

In the example of FIG. 3, a current sensor 311 is connected on the DC side of the converter 304 between the switches 303$_{1-6}$ and a DC capacitor 312. The current sensor 311 may be connected to either or both sides of the DC supply. A second current sensor 313 may be connected on the opposing side of the DC supply between the switches 303$_{1-6}$ and the DC capacitor 312, although for the purposes of measuring the junction temperature of the transistors a single current sensor may be sufficient. The controller 309, or a separate junction temperature measuring system connected to the controller 309, receives a current signal from the current sensor 311 and processes the current signal to estimate a junction temperature of one or more of the transistors $S_{1-6}$.

The current sensor 311 may be a Rogowski coil, which is arranged to measure a rate of change of current (dI/dt) passing through a conductor around which the coil is arranged. An integrator, together with appropriate scaling, is commonly used in combination with a Rogowski coil to convert the rate of change of current to an absolute current.

During operation of the converter 304, the current flow through the current sensor 311 at the point between the switches $303_{1-6}$ and the capacitor 312 contains high frequency switching signals that relate to each of the transistors $S_{1-6}$ being repeatedly switched on and off. These switching signals are smoothed out by the capacitor 312 to provide a smooth and stable DC voltage at the DC bus 310. The high frequency signals can, however, be used to measure operation of each of the transistors $S_{1-6}$ and hence estimate a junction temperature of each transistor, as explained in detail below.

A junction temperature measurement module 710 receives a current signal from the current sensor 311 to provide an estimated junction temperature of each of the transistors $S_{1-6}$ in the controller. The junction temperature measurement module 710 may receive switching signals from the controller 309 or may comprise a synchronous reference frame controller (also known as a dQ controller) to derive switching periods based on the received current signal. Operation of the junction temperature measurement module 710 is described by way of example in further detail below.

FIG. 4

Figures 4A, 4B, 4C:
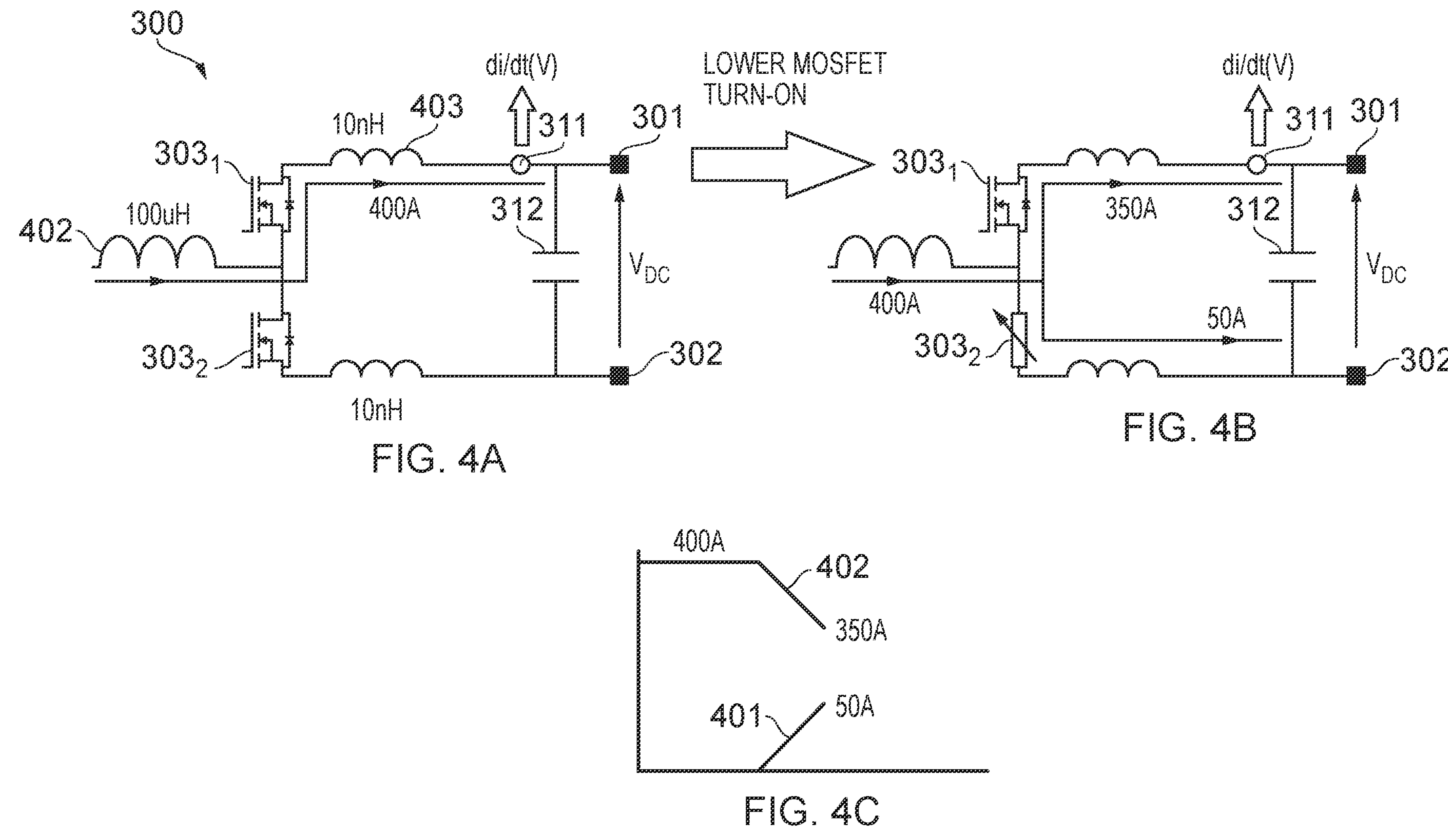
FIG. 4A is a schematic diagram of a single pair of switches in a converter, indicating current flow and inductances during a switching cycle.
FIG. 4B is a schematic diagram of a single pair of switches in a converter, indicating current flow and inductances during a switching cycle.
FIG. 4C is a schematic plot of current over time for the converter of FIGS. 4A and 4B.

FIG. 4 is a schematic diagram of a portion of the converter 304, illustrating a single pair of switches $303_1$, $303_2$ across a DC supply $V_{DC}$, showing how current changes during a single commutation event. In FIG. 4A the first switch $303_1$ is on, resulting in current flow through the first switch $303_1$ towards the first DC terminal 301. The second switch $303_2$ is then turned on, shown in FIG. 4B with the second switch represented as a variable resistor, reflecting the transistor's behaviour during an initial switching period. This initial switching period is represented by a fall in current through the first switch $303_1$ towards the first terminal 301 and a rise in current through the second switch $303_2$ towards the second terminal 302. In the illustrated example, a rise (i.e. a positive change) in current from 0 to 50 A through the second switch $303_2$ corresponds to a fall (i.e. a negative change) in current from 400 A to 350 A through the first switch $303_1$. This is illustrated schematically in FIG. 4C, with the rise in current 401 corresponding to the fall in current 402. With the current sensor 311 in position around the conductor connected to the first DC terminal 301, the current sensor 311 detects the fall in current 402 and provides a dI/dt signal reflecting this change. A current sensor in position around the conductor connected to the second DC terminal 302 would provide a signal of equal magnitude (and opposite sign).

FIG. 4 also illustrates example practical inductances in an AC to DC converter. The inductance 402 on the AC side of the converter 304 corresponds to a typical inductance of an AC side motor or generator, which is relatively large, typically of the order of 100 μH, which maintains a substantially constant 400 A current during the short commutation period. In contrast, the inductance 403 in the DC lines is made up only of the stray inductances contributed by wiring and busbars between the converter switches $303_1$, $303_2$ and the DC capacitor 312. By design this inductance 403 is relatively small, typically around 10 nH, but does also need to be considered when assessing switching behaviour.

By measuring the rate of change of current with the current sensor 311 during a switching period covering the first stage of turn-on of the switch $303_2$, an estimate can be made of the current junction temperature of the transistor. The turn-on dI/dt of a transistor is known to vary with junction temperature and can therefore be used to accurately estimate the junction temperature, based on known or stored characteristics of the transistor. This may be done for example using an algorithm or a look-up table stored locally, such as in a FPGA (field programmable gate array). If necessary, smaller second order effects such as the converter operating voltage, current magnitude and condition of the gate drivers (e.g. the resistance value) may also be input and compensated for in real time.

While the stray inductance 403 may be relatively small, it can be sufficient to influence the accuracy of the dI/dt measurement, and hence the accuracy of the junction temperature estimate. A practical arrangement to minimise this effect is to measure dI/dt only during an initial stage of the turn-on of the transistor, i.e. while the transistor is supporting most of the DC voltage and while starting to carry significant current. At that stage the transistor $303_2$ appears as a high resistance (as shown in FIG. 4B), such that the change in current is dominated by the transistor characteristics and not by the stray inductance 403. The known junction temperature influence on dI/dt during turn-on of the transistor $303_2$ can therefore be utilised, even in the presence of the inductance 403.

FIG. 5

Figure 5:
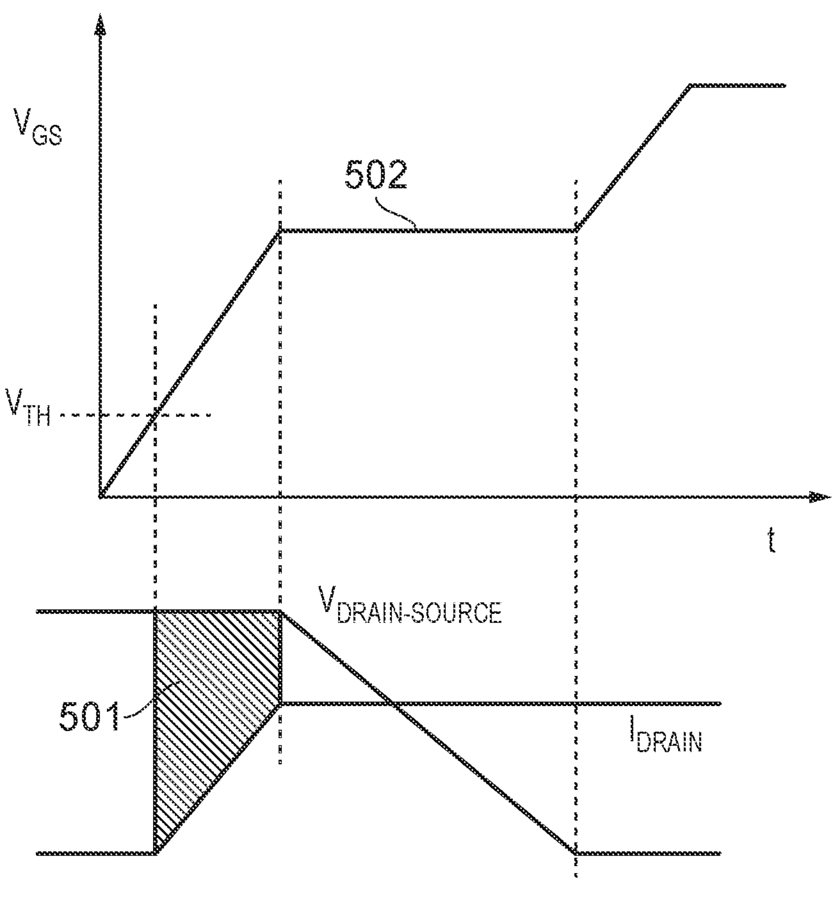
FIG. 5 is a schematic plot of gate-source voltage over time for an example power MOSFET.

FIG. 5 illustrates schematic plots of voltage over time during an initial turn-on phase of a SiC MOSFET, showing where the change in current is proposed to be measured to accurately determine the junction temperature of the transistor. A measurement window 501 is shown extending between points where the gate drive voltage $V_{GS}$ is above the threshold voltage $V_{TH}$ and below a Miller plateau 502. The change of current measurement is therefore taken while the transistor is still supporting most of the DC voltage and appears as a high resistance, as shown in FIG. 4B. For example, with a DC voltage of 540V and a measurement of dI/dt taken between around 10 A and 50 A, the resistance changes from around 54Ω to around 10.8Ω. In a practical converter, this transition may occur in less than around 100 ns. The transition may be between around 20 and 100 ns, for example around 35 ns.

FIG. 6

Figure 6:
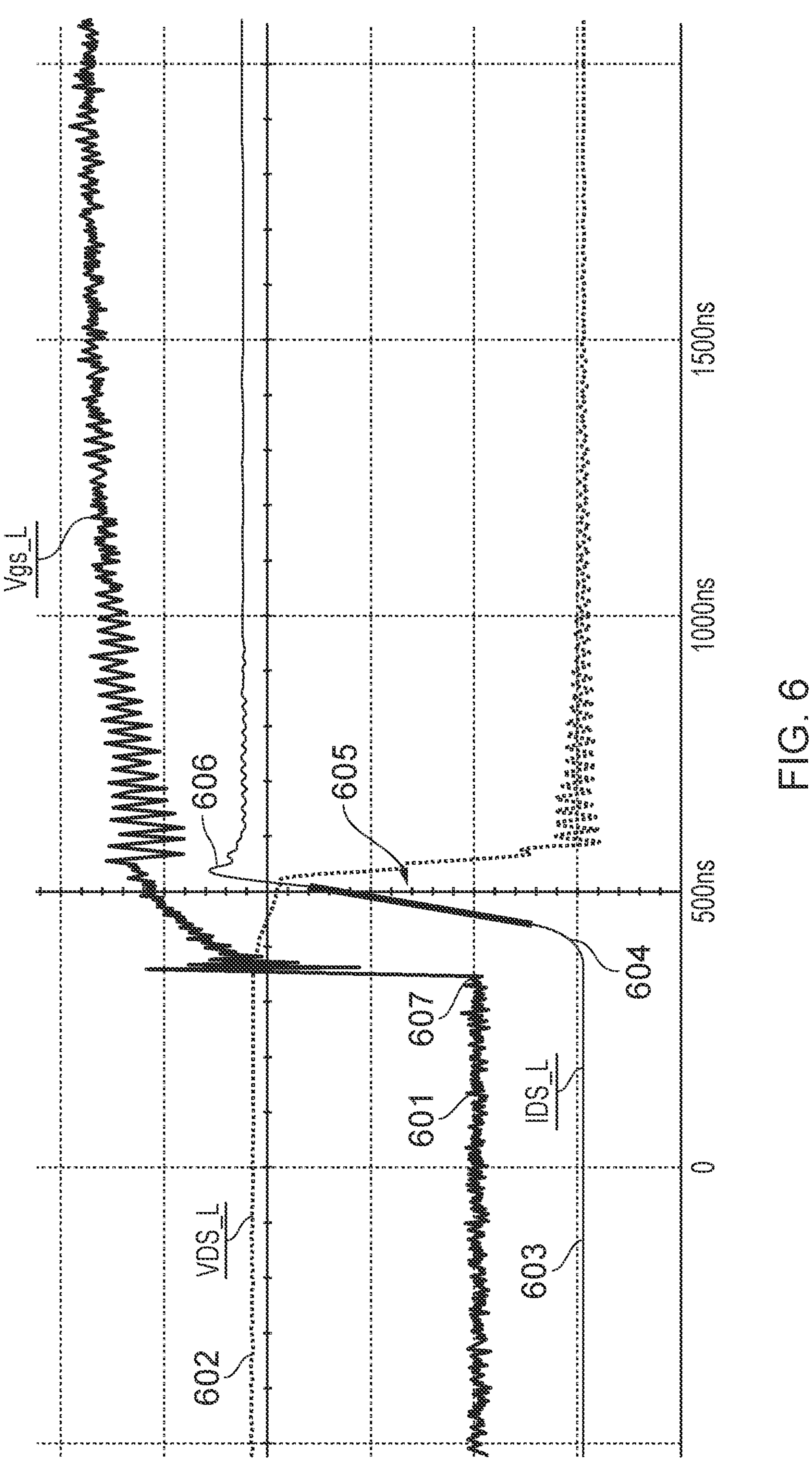
FIG. 6 is an experimental plot of measured drain-source current, drain-source voltage and gate-source voltage over time for an example power MOSFET during a switching period.

Because the transistor represents a high resistance during the initial turn-on stage, a high degree of damping is provided such that the current waveform is substantially linear and an accurate measure of dI/dt can be made. This is illustrated in the plots of current and voltage in FIG. 6, which show measurements taken on an AC:DC power converter covering a switching cycle of one of the MOSFETs in the converter. The time axis in FIG. 6 illustrates the relatively short time period of less than 100 ns during which the change in current over time is substantially linear. After initiation of the switching cycle, the gate voltage 601 rises upon the start 607 of switch-on (at around t=350 ns in FIG. 6), resulting in the drain-source voltage $V_{DS}$ 602 falling and the drain-source current $I_{DS}$ 603 rising. Following a short initial non-linear region 604, once the gate voltage 601 rises above the threshold voltage $V_{TH}$ the rise in current 603 enters a linear region 605. The rate of change of current is measured during this period to determine the junction temperature of the transistor. Towards the end of the switching cycle the drain-source current over-shoots its final value before settling. There is also some oscillatory behaviour which would distort and invalidate any measurement of dI/dt due to a change in sign after the initial overshoot 606. These responses are strongly influenced by the external circuit rather than the characteristics of the MOSFET itself. The dI/dt measurement is therefore taken at an early stage of the switching cycle, which is defined by a period between the point at which the threshold voltage is exceeded and before the drain-source voltage has reduced significantly. It can be seen from FIG. 6 that the drain-source voltage starts to fall more rapidly around the point at which the drain-source current peaks. Limiting measurement of the rate of change of current to the period 605 therefore ensures that a substantially linear measurement is obtained that can be accurately correlated to the junction temperature of the transistor.

It is understood that the dI/dt of SiC MOSFETs in particular during a switching cycle increases with junction temperature. This is caused by the transconductance of the device increasing with temperature, which is influenced by the electron mobility and change in the threshold voltage $V_{TH}$, (as shown in FIG. 5), with both parameters playing a part. The transconductance is the effective gain of the semiconductor relating the gate-source voltage $V_{GS}$ to the main drain-source current $I_{DS}$. With a fixed gate voltage and gate resistor, the increase in transconductance with junction temperature is observed as an increase in dI/dt. This may be measured with a Rogowski coil, which outputs a voltage signal proportional to the change in current dI/dt.

In an example implementation, a dI/dt measurement may be made using an LCR circuit with a high level of changing resistance when the measurement is taken. The current and dI/dt are controlled by the almost constant DC voltage across the MOSFET as a function of its resistance change during its initial turn-on period, which is strongly temperature dependent. Given where the Rogowski coil is situated, there is a small impact on dI/dt created by the associated voltage across the stray inductance, which is not temperature dependent. The converter characterisation of the DC line dI/dt should therefore fully includes the stray inductance of wiring and busbars to achieve maximum accuracy.

FIG. 6 shows that there is a delay in the start of MOSFET current flow as the gate voltage increases until it reaches the threshold voltage $V_{TH}$. The known phenomenon of $V_{TH}$ shift with MOSFET ageing may also be compensated for and measured, which is described in more detail below.

The converter may be characterised at its design stage based on the particular MOSFET, gate driver and converter layout such that a measurement of dI/dt during the initial turn-on phase will provide an accurate indication of MOSFET junction temperature. Prior to use, the converter may be calibrated so that an accurate measure of junction temperature can be taken. Each converter may therefore need to undergo a calibration procedure during manufacture, although common calibration parameters may be applied for converters of the same type. Re-calibration may be needed to adjust for ageing of the MOSFETs and possibly also of the gate drive and other features that may influence the measurement such as the DC-Link capacitor. This calibration may be carried out after a fixed operating period or via a predictive maintenance test. The prediction may for example come from a statistical long term performance record, or from a specific pulse test.

To calibrate the converter, dI/dt data related to junction temperature needs to be collected. There are a number of ways this may be done so that the MOSFET junction temperature can be measured. The converter may for example be held at a fixed temperature in a chamber until the temperature stabilises. It may then be assumed with a high degree of certainty that the MOSFET junction is at this temperature. An NTC resistor in the module may be used to measure the junction temperature in a temperature stable environment. The manufacturers' MOSFET simulation models may also be used that output the junction temperature operating within a calibration test circuit. A theoretical value for junction temperature may be used based on device physics and related mathematically to dI/dt, although this may not be able to take into account all factors.

It is proposed that, once the characterisation information is established and validated, a relationship between dI/dt and junction temperature is stored as an algorithm or equation, or in the form of a look-up table in a device such as an FPGA, which converts the dI/dt (V) measurement into an accurate junction temperature estimation in real time. Synchronising dI/dt measurements with each of the MOSFET gate-drive signals enables the junction temperature of each MOSFET to be separately identified at each switching instant, or as often as is practically required. Junction temperature estimation may not be possible, or necessary, for all switching events but may be carried out on a selected number of switching events over each AC cycle, for example for switching events where there is no overlap with other switching events.

The dI/dt (V) signals from a Rogowski coil are preferably converted into digital form for processing by a junction temperature calculation algorithm implemented on a microprocessor, which may for example be an FPGA controller. To perform this, a suitable Analogue to Digital Converter (ADC) is required that is capable of taking a suitable number of samples over a period of less than 100 ns. A sampling rate of the ADC may need to be over 10 MHz to achieve a time resolution that is sufficient to provide a reasonable number of samples over each switching period. The sampling rate may for example be between around 20 MHz and 500 MHZ, which would provide between 2 and 50 samples over a 100 ns sampling period. The effective sampling rate of the ADC may be increased by interleaving a number of slower, and potentially cheaper, ADCs operating in parallel with appropriate phase shifts.

FIG. 7

Figure 7:
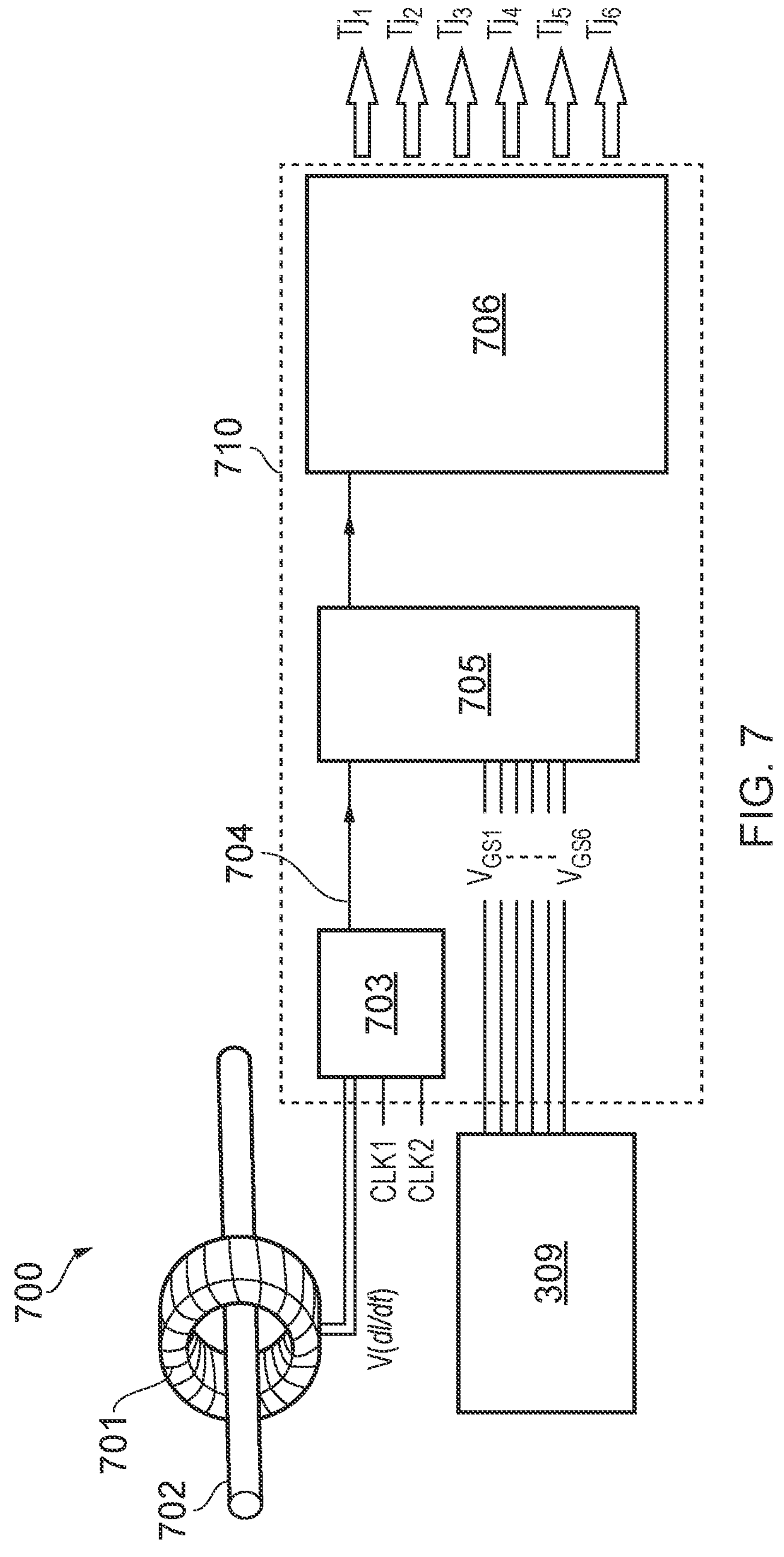
FIG. 7 is a schematic diagram of an example system for estimating a junction temperature of transistors in a power electronics converter.

FIG. 7 is a schematic diagram of an example implementation of a system 700 for estimating a junction temperature of a transistor in a power electronics converter 304. The system 700 may be incorporated in the controller 309 as illustrated in FIG. 3 or may form a separate unit connected to the controller 309. The system 700 comprises a current sensor in the form of a Rogowski coil 701 around a conductor 702 between the converter switches $\mathbf{303}_{1-6}$ and the capacitor 312 (see also FIG. 3). A signal from the current sensor 701 is provided to a junction temperature measurement module 710, which outputs an estimated junction temperature $Tj_{1-6}$ for each of the transistors in the converter 304 dependent on signals received from the current sensor 701 and switching signals $V_{GS1-6}$ from the controller 309.

A signal from the coil 701 is provided to an ADC 703, which operates according to one or more clock signals CLK1, CLK2. As indicated above, the ADC 703 may be an interleaved ADC operating at an effective higher sampling rate than the multiple interleaved clock signals provided to the ADC.

A digital output signal 704 from the ADC 703 is provided to a processor 705. The processor 705 may also receive the MOSFET gate signals $V_{GS1-6}$ provided to each of the switches $\mathbf{303}_{1-6}$ of the converter 304. The processor 705 is configured to synchronise each of the gate signals $V_{GS1-6}$ with the digital output signal 704 and extract a measure of dI/dt for each switching signal that is at a point where the gate voltage of the corresponding transistor is above the gate threshold voltage and the drain-source voltage is above a predetermined fraction of the DC supply voltage. The predetermined fraction may be set according to the type of transistor and according to a previously carried out calibration, and may for example be around 75%, 80%, 85%, 90% or 95%. Synchronisation of the digital output signal 704 to define switching periods may be achieved by determining the point at which the gate-source voltage for a particular transistor exceeds its threshold voltage and sampling the signal 704 over a subsequent defined sampling period. Synchronisation may alternatively be achieved by use of a dQ controller to identify switching periods from the signal 704 itself. The sampling period covering the switching period of each transistor, i.e. the period when the gate voltage is above the threshold voltage and the drain-source voltage is above the predetermined fraction of the DC supply voltage, may be defined by a predetermined time period.

The processor 705 provides each extracted measure of dI/dt for each transistor to a look-up table 706, which may for example be implemented on an FPGA. The look-up table 706 is configured to provide a corresponding junction temperature value $Tj_{1-6}$ for each of the extracted dI/dt measurements. The junction temperature values $Tj_{1-6}$ may be provided to the controller 309 as a control input for operating the converter 304, for example to limit operation of the converter 304 if any of the junction temperatures exceed a predetermined temperature limit.

The switching period during which the rate of change of current is measured may be between around 20 ns and around 100 ns, between around 20 ns and around 50 ns, between around 30 ns and around 40 ns, and in a particular example may be around 35 ns The start of each switching period may be determined based on the controller 309 sending a gate switching signal, following which there will be a known delay before the gate voltage exceeds the threshold voltage.

FIG. 8

Figure 8:
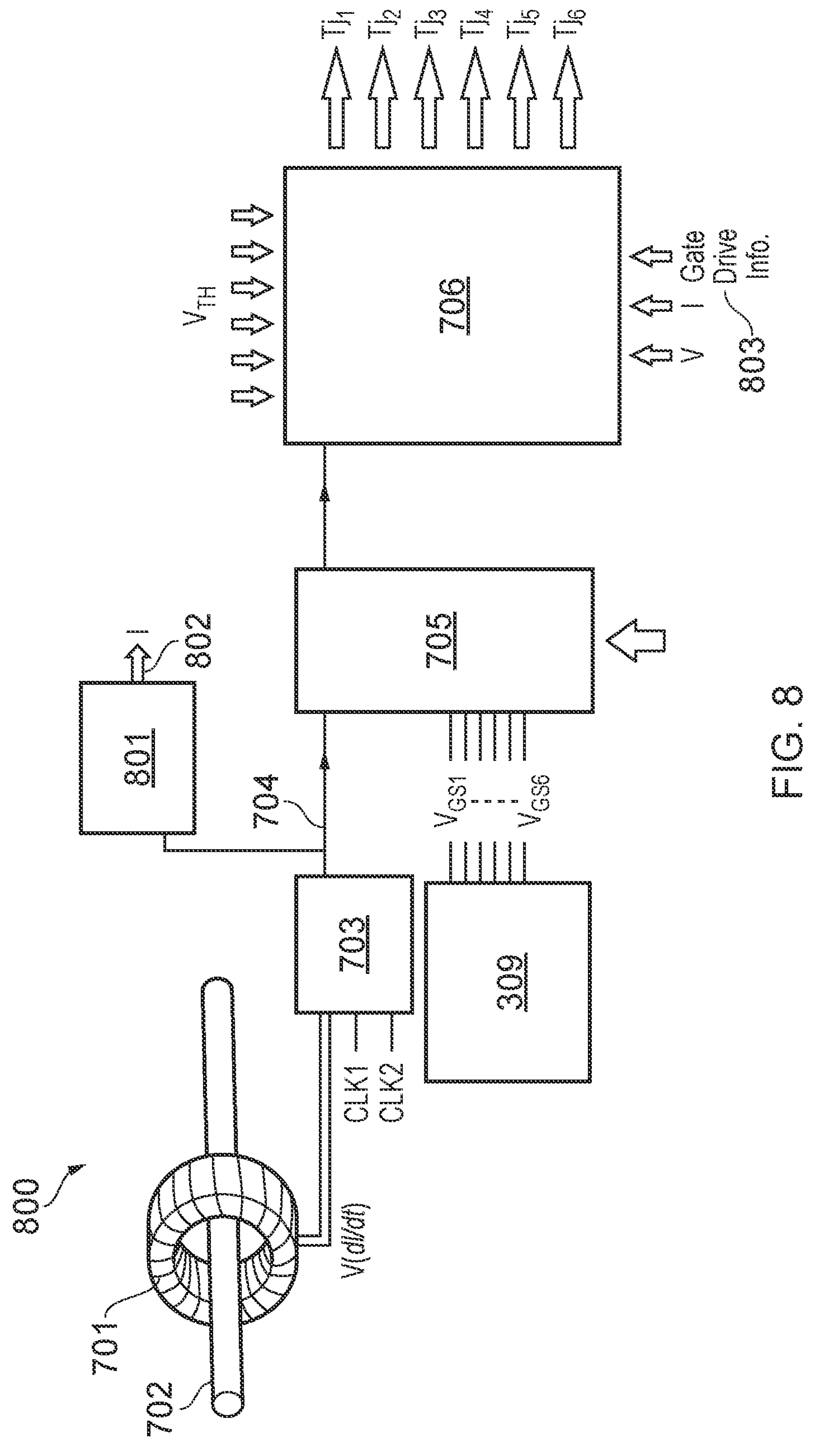
FIG. 8 is a schematic diagram of an alternative example system for estimating a junction temperature of transistors in a power electronics converter.

FIG. 8 is a schematic diagram of an alternative system 800 for measuring a current rate of change in a power electronics converter. As with the system 700 of FIG. 7, the system 800 may be incorporated into the controller 309 or form a separate component connected to the controller 309. Along with the various components of the system corresponding to those in FIG. 7, i.e. the Rogowski coil 701, ADC 703, processor 705 and look-up table 706, further features may be included to provide a more accurate measure of junction temperature that take into account calibration parameters and current operating parameters of the converter 304.

An integrator 801 is connected to receive the digital output signal 704 from the ADC 703 and configured to convert the rate of change of current signal to a current magnitude signal 802. This current signal I may be provided to the look-up table 706 as a further parameter that affects the estimated junction temperatures $Tj_{1-6}$. Further parameters such as the operating voltage V, which may vary during operation of the converter 304, may be input to the look-up table 706. Further gate drive information 803 may be provided to the look-up table 706. The gate drive information 803 may include the driving voltage and gate resistance, which may change with ageing, temperature or other factors.

The threshold voltage $V_{TH}$ for each of the transistors in the converter 304 may be provided to the look-up table 706.

Ageing and Initialisation

As outlined above, a change in electron mobility is a factor that can affect how dI/dt in a transistor may change with temperature. A shift in the threshold voltage $V_{TH}$ as a transistor ages is also expected to affect how dI/dt in the transistor will change with temperature. The stored values in the look-up table 706 may be adjusted or compensated for periodically, for example at the start of each flight cycle, by determining if a change in $V_{TH}$ is detected. To do this, the processor 705 of the junction temperature measurement module 710 may, in conjunction with the controller 309, be arranged to perform a calibration routine on the converter 300 to determine a measure of the threshold voltage of each transistor at a known temperature.

At start-up, the unenergized MOSFETs may be assumed to be at the same temperature as the associated heatsink or coolant, which may in practice be measured by a temperature sensor 314 (FIG. 3) such as an NTC thermistor or thermocouple within the converter 300. A measurement of the gate voltage at the point the current starts to rise, or passes a predetermined current threshold, for example 10 A, for each of the transistors then provides a measurement of $V_{TH}$ at a known temperature for each transistor. Any changes in $V_{TH}$ are then detected and used to alter the junction temperature algorithm to compensate for device ageing or other deterioration effects.

A larger change in $V_{TH}$ for one transistor in the converter compared to others would indicate deterioration of the transistor, which should be flagged up and sent to a converter health monitoring system.

Alternatives

The converter 304 described herein is a 3-phase AC:DC converter. The converter may have a different number of phases, from 1 upwards. The converter may alternatively be a DC:DC or DC:AC converter, each of which may include multiple switching transistors that can be monitored for their junction temperature in a similar way to that described above.

More than one Rogowksi coil may be used with the converter, for example by including a coil on both connections of the DC side of the converter and/or on each of the AC phase connections.

The methods described above may rely on a measurement of dI/dt over a short period of less than 100 ns, which requires fast processing using a high speed ADC having a high sampling rate. To allow for an ADC with a reduced sampling rate, or a more accurate measure of dI/dt, switching of the transistors could be deliberately slowed down, for example by dynamically adjusting the value of a gate resistor on each transistor to slow down the rate of current change. This would enable more samples to be taken by the ADC, increasing its accuracy or allowing slower (and cheaper) ADCs to be used. Slowing down the MOSFET turn-on could increase energy losses, for example through increased switching losses, but this should not have an appreciable effect on junction temperature or alter operation of the converter if carried out on an infrequent basis.

The methods described above relate to exploiting the substantially linear temperature dependence of MOSFET turn-on dI/dt during the initial stage of turn-on when the transistor is relatively resistive and supports a relatively high voltage. A weaker relationship with MOSFET turn-off dI/dt decreasing with temperature may also be used to support a real time estimation of MOSFET junction temperature. The same single measurement of dI/dt(V) in the DC lines coupled with the gate drive signals $V_{GS1-6}$ could be used with stored characterisation data to determine the MOSFET junction temperature using the measured dI/dt at turn-off. In principle, both the turn-on and turn-off dI/dt information could be used in order to determine the junction temperature of all MOSFETs, if required. It is possible that external circuit impedances have a greater effect on dI/dt at turn-off than at turn-on, resulting in the observed weaker relationship. Measuring during turn-on is therefore generally expected to provide more accurate estimates of junction temperature.

By measuring the magnitude and polarity of the dI/dt in the DC lines, the resulting information may also be used to detect fault conditions such as converter shoot-through and DC network faults, particularly if the dI/dt measurement is combined with measured DC network or DC capacitor voltage information.

The composite complex current waveform in the DC line reflects the switching of all MOSFETs and also contains information relating to the current in all AC side phases. As such, the AC current and dI/dt information can detect imbalance between the three phases and detect changes such as inter-turn short circuits in the motor or generator, which have been notoriously difficult to detect.

Advantages

Advantages relating to the above described aspects may include one or more of the following:

All junction temperatures can be separately estimated from a single dI/dt(V) measurement in the DC line. The Rogowski coil is a known and established current sensor capable of operating at the high frequencies and accuracies required to enable this.

The junction temperatures are available in real time based on known and proven changes in the device characteristics that affect dI/dt at turn-on. A near instantaneous estimate of temperature can thereby be made that does not suffer from the time-lag of NTC thermistor methods.

The proposed method may be compensated to take into account known MOSFET ageing effects as well as the influences of the gate driver and converter operating voltage and current.

The proposed method largely decouples itself from the influence of stray inductance in the current commutation loop at turn-on, allowing the MOSFET itself to dominate dI/dt against junction temperature characteristics. The small influence of stray inductance and associated errors can be taken into account at the calibration stages.

The measurement method enables converters to be operated nearer to their thermal limit, which can increase their rating. Output operating conditions can be quickly adjusted to respond to the conditions of the electrical power system. Ultimately this could increase the power density of the applied power electronic converters.

Response to detecting fault conditions with high current stress can be improved, for example by performing a fault ride-through, crowbar, or disconnection. Quicker recovery from faults may also be enabled as the junction temperature can be monitored when power flow is ramped up and resumed.

Ageing effects leading to increased junction temperature can be monitored that may potentially indicate end of component life, enabling components to be replaced when required and before actual failure.

Equipment or system faults leading to increased junction temperature can be detected, such as loss of coolant, module heatsinking/thermal management deterioration, slow transistor switching, or any other condition resulting in an over-current event.

Individual threshold voltage $V_{TH}$ measurements provide additional health monitoring, as a change in any one device compared to its neighbours indicates deterioration/ageing of that particular component.

The invention claimed is:

1. A method of estimating a junction temperature of a transistor in a power electronics converter configured to convert between first and second supply voltages, the method comprising:
- providing a gate switching signal to the transistor;
- measuring a rate of change of current through the converter during a switching period of the transistor; and
- outputting an estimated junction temperature of the transistor based on the measured rate of change of current,
- wherein the rate of change of current is measured by inputting the gate switching signal and an output of a current sensor to a processor, and the processor then extracts a measure of the rate of change of current at a point where a gate voltage of the transistor is above a gate threshold voltage and a drain-source voltage across the transistor is above a predetermined fraction of the first or second supply voltage whereby the rate of change of current is measured in a linear region.

2. The method of claim 1, wherein the switching period is between around 20 ns and 100 ns.

3. The method of claim 1, wherein
- the current sensor comprises a Rogowski coil so that an output of the Rogowski coil is input to the processor as the output of the current sensor, and
- the converter comprises a plurality of transistors and a capacitor, and the Rogowski coil is located around a conductor of the converter between the plurality of transistors and the capacitor.

4. The method of claim 1, wherein:
- a controller provides the gate switching signal to the transistor;
- the measured rate of change of current is provided to an analogue to digital converter, ADC;
- the ADC provides a digital output signal from the measured rate of change of current to the processor;
- the processor synchronises the gate switching signal from the controller with the digital output signal and extracts a measurement of rate of change of current for the switching period; and
- a look-up table receives the extracted measurement of rate of change of current and outputs a corresponding junction temperature value for the transistor.

5. The method of claim 4, wherein the method is repeated for each one of a plurality of transistors of the converter.

6. The method of claim 1, comprising changing a value of a gate resistor connected to the transistor prior to providing a gate switching signal to the transistor.

7. The method of claim 6, wherein the value of the gate resistor is increased prior to providing the gate switching signal to the transistor and decreased after measuring the rate of change of current through the converter during the switching period of the transistor.

8. The method of claim 1, wherein the gate switching signal ($V_{GS1-6}$) is provided to switch the transistor from a non-conducting state to a conducting state.

9. The method of claim 1, wherein the gate switching signal is provided to switch the transistor from a conducting state to a non-conducting state.

10. The method of claim 1, wherein the predetermined fraction is between around 0.75 and 0.95.

11. An electrical power system, comprising:

a power electronics converter configured to convert between first and second supply voltages, the converter comprising a plurality of semiconductor switches, each semiconductor switch comprising a transistor;

a controller configured to provide switching signals to each of the semiconductor switches;

a current sensor arranged to measure current through the converter to one of the first and second voltage supplies; and a junction temperature measurement module comprising a processor and configured to:

receive the switching signals; and receive a current signal from the current sensor;

measure, based on the current signal received from the current sensor and the switching signals, a rate of change of current through the converter during a switching period of the transistor while a gate voltage of the transistor is above a gate threshold voltage and a drain-source voltage across the transistor is above a predetermined fraction of the first or second supply voltage whereby the rate of change of current is measured in a linear region; and output an estimated junction temperature of the transistor based on the measured rate of change of current.

12. The electrical power system of claim 11, wherein the power electronics converter is configured to convert between a DC supply voltage and an AC supply voltage or between a first DC supply voltage and a second DC supply voltage.

13. The electrical power system of claim 11, wherein the converter comprises a capacitor connected across one of the supplies, the current sensor comprising a Rogowski coil located around a conductor of the converter between the plurality of transistors and the capacitor.

14. The electrical power system of claim 11, wherein the junction temperature measurement module comprises:

an analogue to digital converter, ADC configured to receive the current signal and convert the current signal to a digital output signal;

the processor configured to: receive a gate switching signal from the controller and the digital output signal from the ADC; synchronise the gate switching signal from the controller with the digital output signal and extract a measurement of rate of change of current for the switching period; and a look-up table configured to receive the extracted measurement of rate of change of current from the processor and output a corresponding junction temperature value for the transistor.

15. The electrical power system of claim 14, wherein the junction temperature measurement module further comprises a current integrator configured to integrate the current signal from the current sensor and provide a measure of current through the converter as an input to the look-up table.

16. The electrical power system of claim 14, wherein the look-up table is further configured to receive a measure of a threshold voltage ($V_{TH}$) for the transistor ($S_{1-6}$) and output the corresponding junction temperature value ($Tj_{1-6}$) for the transistor ($S_{1-6}$) according to the measured threshold voltage ($V_{TH}$).

17. The electrical power system of claim 14, wherein the processor is configured to extract a measurement of rate of change of current for the switching period for each one of the plurality of transistors ($S_{1-6}$).

18. The electrical power system of claim 11, wherein the transistor is a MOSFET.

19. An aircraft propulsion system comprising the electrical power system of claim 11.

20. An aircraft comprising the electrical power system claim 11.

* * * * *